US005114533A

United States Patent [19]

Guy et al.

[11] Patent Number: 5,114,533

[45] Date of Patent: May 19, 1992

[54] CLOSING COVERS OF APPARATUSES WITH CENTRIFUGAL ROTORS

[75] Inventors: Jean-Luc Guy, Massy; Jean-Pierre Saladin, Bagneux, both of France

[73] Assignee: Jouan, Saint-Nazaire, France

[21] Appl. No.: 487,936

[22] Filed: Mar. 5, 1990

[30] Foreign Application Priority Data

Mar. 17, 1989 [FR] France ............................... 89 03505

[51] Int. Cl.[5] ......................... B01D 1/00; B65D 43/16

[52] U.S. Cl. ........................... 159/6.1; 159/DIG. 15; 159/DIG. 16; 220/331; 422/101; 436/177; 494/60; 494/61

[58] Field of Search .................. 159/6.1, 49, DIG. 16, 159/DIG. 15; 436/177; 422/101; 494/60, 61; 220/331, 344; 202/236, 238, 205

[56] References Cited

U.S. PATENT DOCUMENTS 2,085,503 6/1937 Lothian .
2,682,351 6/1954 Durand et al. .
3,304,990 2/1967 Ontko et al. ......................... 159/6.1
3,347,453 10/1967 Goergen ............................... 494/61
3,391,862 7/1968 Jacobsen et al. ...................... 494/60
3,490,642 1/1970 Friedlander ......................... 220/331
4,226,669 10/1980 Vilardi ................................ 159/6.1
4,666,424 5/1987 Harlacker ............................ 494/60
4,764,162 8/1988 Romanauskas ........................ 494/61
5,004,453 4/1991 Hayasaka et al. ..................... 494/60

*Primary Examiner*—Wilbur Bascomb, Jr.
*Attorney, Agent, or Firm*—Larson and Taylor

[57] ABSTRACT

Improvement in closing covers of apparatuses such as concentrators-evaporators, ultracentrifugal and centrifugal apparatuses, in which a centrifugal rotor rotates in an enclosure in which a vacuum may be established. The cover is formed by a plate (11) which is guided in translation by projections (14*a*, 14*b*) traveling in guide rails (12) so as to maintain the cover in a horizontal position when it overlies the opening and allow the pivoting of the cover when it has been displaced in its plane to a releasing position.

13 Claims, 4 Drawing Sheets

CLOSING COVERS OF APPARATUSES WITH CENTRIFUGAL ROTORS

The present invention relates to an improvement in closing covers of rotary apparatuses such as concentrators-evaporators, ultracentrifugal apparatuses and centrifugal apparatuses employing a vacuum, etc.

Apparatuses such as centrifugal concentrators-evaporators, centrifugal apparatuses and ultracentrifugal apparatuses usually comprise, within a fixed enclosure, a rotor, rotating about a vertical axis, the enclosure being provided with an upper opening which is most often circular provides access to the rotor. This opening is usually closed by a cover which is pivotable about a horizontal axis and must satisfy many requirements.

This cover must ensure a closure which provides a seal with respect to the vacuum established in the enclosure, in particular when it concerns a concentrator-evaporator or an ultracentrifugal machine, and must be capable of resisting the difference in the pressures. It must participate, with the rest of the enclosure, in the function of a mechanical barrier in the event of an explosion or disintegration of the rotor. It must most often be made from a transparent material allowing the visual inspection of the rotor in operation and also, in many cases, the passage of a radiation coming from an exterior source and adapted to heat the contents of the rotor by this radiation.

Lastly, it must be easy to handle and capable of being locked in the closing position during the operation of the apparatus in order to avoid material and corporal accidents.

Consequently, in apparatuses of the aforementioned type, covers exist which are made from a transparent material such as glass of great thickness and therefore heavy. These covers are difficult to handle and, owing to their weight, may cause injury in the event of an accidental pivoting. Lastly, they are particularly space-consuming in both the open state and during their pivoting.

An object of the present invention is to overcome these drawbacks by improving the closing covers of apparatuses of this type.

The invention in particular has for object to provide an improved cover which avoids the risks of material or corporal accidents when handling the cover.

Another object of the invention is to avoid or reduce the risks of an accident or incident when unlocking the closure means.

A further object of the invention is to considerably reduce the overall size of the cover, and therefore of the apparatus, in particular in the open position and during the movement of the cover.

Yet another object of the invention is to limit the wear of the sealing element usually associated with the cover and to exert a force on this sealing element in a homogeneous manner.

A further object of the invention is to facilitate the manual operation of the cover.

The invention provides an improvement in closing covers of apparatuses such as concentrators-evaporators, ultracentrifugal and centrifugal apparatuses and in particular apparatuses in which a centrifugal rotor rotates about a vertical axis in an enclosure in which a vacuum may be established, said enclosure having an upper opening in a substantially horizontal plane and a cover for closing said opening, wherein said closing cover comprises a strong plate which is guided in translation along the opening, by guide means, between a closing position superimposed on the opening and in which the plate is prevented from moving away from the plane of the opening, and a releasing position which is offset, in said plane, from the closing position, said plate being associated with means for pivoting, solely in said releasing position, the plate about an axis located geometrically at the level of a lateral edge of the enclosure, so that the plate occupies, in proximity to said edge, a pivoted position making a large angle, preferably on the order of 90°, with the horizontal plane of the opening.

A "strong platek" according to the invention is intended to mean a planar plate which may have any periphery, for example a square or rectangular periphery, and sufficient thickness to be capable of resisting stresses created by the establishment of a high vacuum in the enclosure and shocks which might result from rupture or disintegration of the rotor. The plate may be advantageously made, for purposes of observation, from a transparent material such as glass, polycarbonate, a composite glass-plastics material structure, etc. capable of resisting pressure, bursting and, if required, chemical corrosion.

Preferably, the axis about which the plate is pivotable when it reaches its releasing position, geometrically passes through the plate or is geometrically projected thereon, along a line intermediate between the two edges of the plate and preferably substantially in the median third of the plate so that, in the pivoted position, a part of the plate is located above the plane of translation of the plate, i.e. substantially the plane of the opening, whereas the other part of the plate is located below this plane in immediate proximity to a rear edge of the enclosure of the apparatus.

In this way there results a particularly small overall size not only in the open position of the closing plate but also in its path between the pivoted position and the closing position.

The means for guiding in translation preferably comprise two rails or guides disposed on each side of the plate and guiding lateral projections of the plate which maintain the plate in its horizontal position in the guide means, said guides allowing said projections to escape when the plate reaches its releasing position. Advantageously, the means associated with the plate for permitting its pivoting may also include lateral projections of the plate in the form of pivots or trunnions which, in a variant of the invention of particular interest, may be received in the same guides and turn therein.

In the closing position, the plate comes to be superimposed on the upper opening provided in the enclosure and it is preferred that this opening possess a continuous sealing element adapted to cooperate with the lower side of the plate and provide the seal. Preferably, the guide means include, for the closing position, passages or recesses permitting the escape of the plate solely in the downward direction, i.e. in a direction perpendicular to the plane of the opening, so that the plate can be applied against the sealing element and compress it when the vacuum is established in the enclosure.

However, as a variant, it may also be arranged that the guide means bring about, substantially toward the end of the movement of translation of the plate toward its closing position, a forced lowering of the plate for the purpose of crushing the sealing element.

In another variant, it may also be arranged that, in its closing position, the plate remain perfectly immobile in height, the sealing element then having a special shape, known per se, which enables it, when the vacuum is established, to ensure the seal by being perfectly applied against the plate.

In a particularly preferred arrangement, the cover may be associated with means for locking the cover in its closing position, these means merely preventing the translation of the plate away from this position. These means may comprise a simple abutment which comes to be placed behind the edge of the plate facing the releasing position, the other edge being maintained in the closing position by an abutment which may for example be formed by the guide means. The control for bringing into action and releasing the locking means may be of any type, but it is preferred that this locking be automatically achieved when the apparatus is started up and automatically released at the end or toward the end of the rotation of the rotor, for example by means detecting that the speed of the rotor has dropped below a certain value.

Further features and advantages of the invention will be apparent from the following description, which is given as a non-limitative example with reference to the accompanying drawings, in which.

Figure 1:
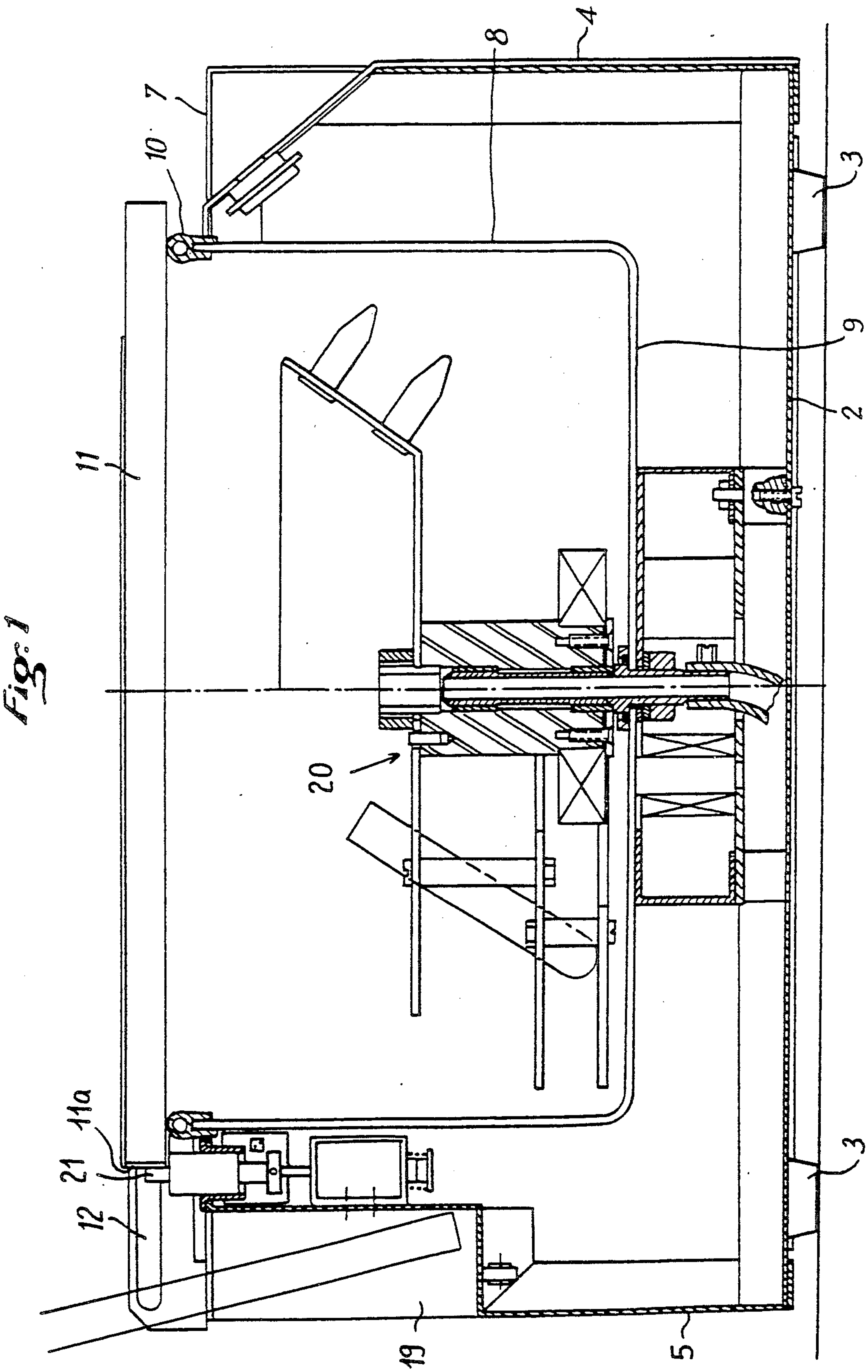
FIG. 1 is an axial sectional view of an apparatus according to the invention.
Figure 2:
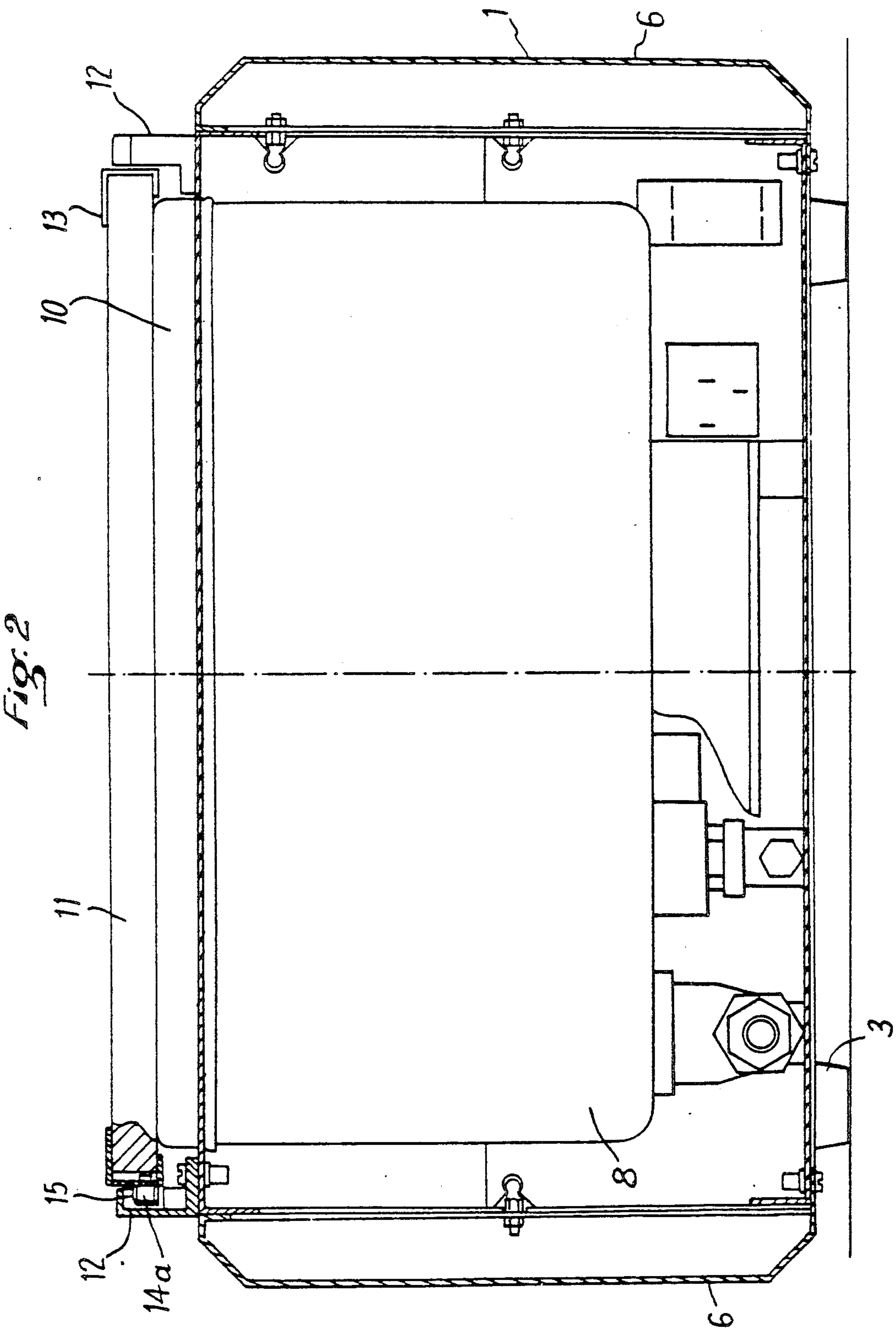
FIG. 2 is a front side view of the apparatus with the front side of the casing removed.
Figure 3:
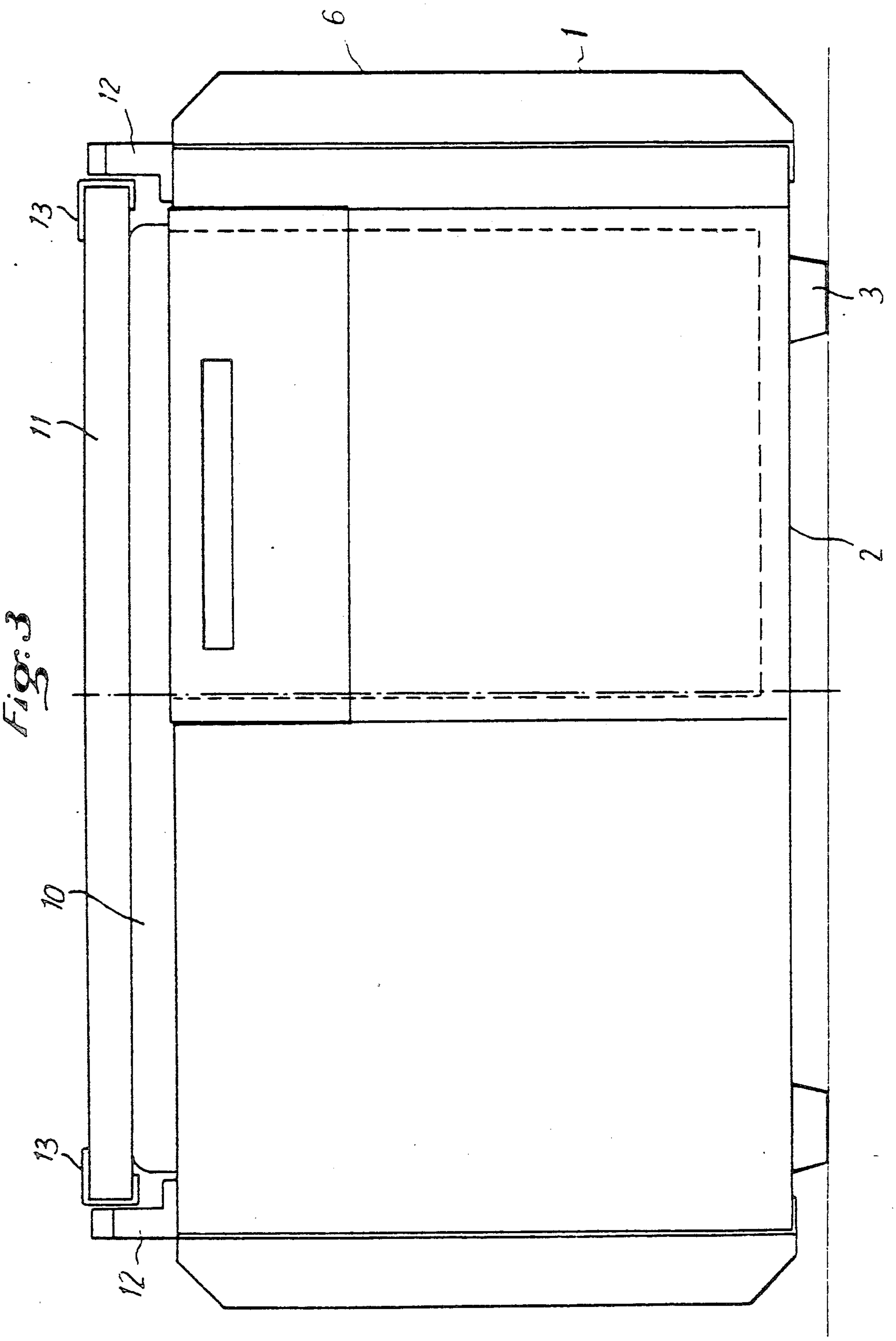
FIG. 3 is a front side view of the apparatus.

The illustrated apparatus is a centrifugal concentrator-evaporator. It comprises a casing or cowling 1 having a generally parallel-sided shape with a bottom 2 constituting a base resting on feet 3, a front side 4, a rear side 5, lateral sides 6 and an upper side 7. The upper side 7 has a large circular opening through which extends the edge of a circular drum 8 forming a cylindrical enclosure with a bottom 9 and an annular sealing element or lip 10 around the opening. The casing 1 contains various components of the apparatus which will not be described in more detail any more than the centrifugal specimen-carrying rotor 20 rotatable about a vertical axis in the drum 8.

In the closed position, the drum or enclosure 8 is closed by a cover 11 formed by a square plate of thick glass which rests on the sealing element 10. This cover 11 is movable in translation in its horizontal plane between the advanced closing position and the retracted releasing position, it being guided by two parallel lateral rails 12 carried by the edge or upper side 7 of the casing and having a U-shaped inner section. For this purpose, the two lateral edges of the cover 11 are each provided with a metallic fitting 13 which carries two studs **14*a*, 14*b* each surrounded by an anti-friction, preferably rotatable, ring 15 extending into the respective rails 12**.

The front studs **14*a*, relative to the direction of advance of the cover toward its closing position, are located roughly in a position 1/5th along the length of the cover 11 in the direction away from said closing position, and the rear studs 14*b* are located in a position about ⅔rds along said length of the cover. As can be seen in particular in FIG. 4, the guide rails 12 have an inner height hardly greater than the diameter of the rings 15 so that the plate forming the cover 11 is guided, in its path in a horizontal plane bringing it to a position in vertical alignment with the upper edge of the sealing lip 10, with a slight clearance in height. However, when the cover 11 reaches its closing position, the four studs 14*a*, 14*b* simultaneously come into confronting relation to four vertical recesses 16 in the rails so that the cover 11, under the effect of its weight, slighly descends and is applied against the sealing element 10. When the depression is established within the drum 8, the cover 11 compresses the sealing element, the recesses 16 allowing the additional movement of descent of the studs 14*a*, 14*b* which whereupon lock the cover 11 in its horizontal position. On the other hand, when atmospheric pressure is re-established in the enclosure 8, the sealing element 10 is decompressed and this causes the cover 11 and the studs to rise sufficiently to enable, upon a slight manual translation of the cover, the rings to roll and rise out of their recess along the guide track of the rails 12**.

Figure 4:
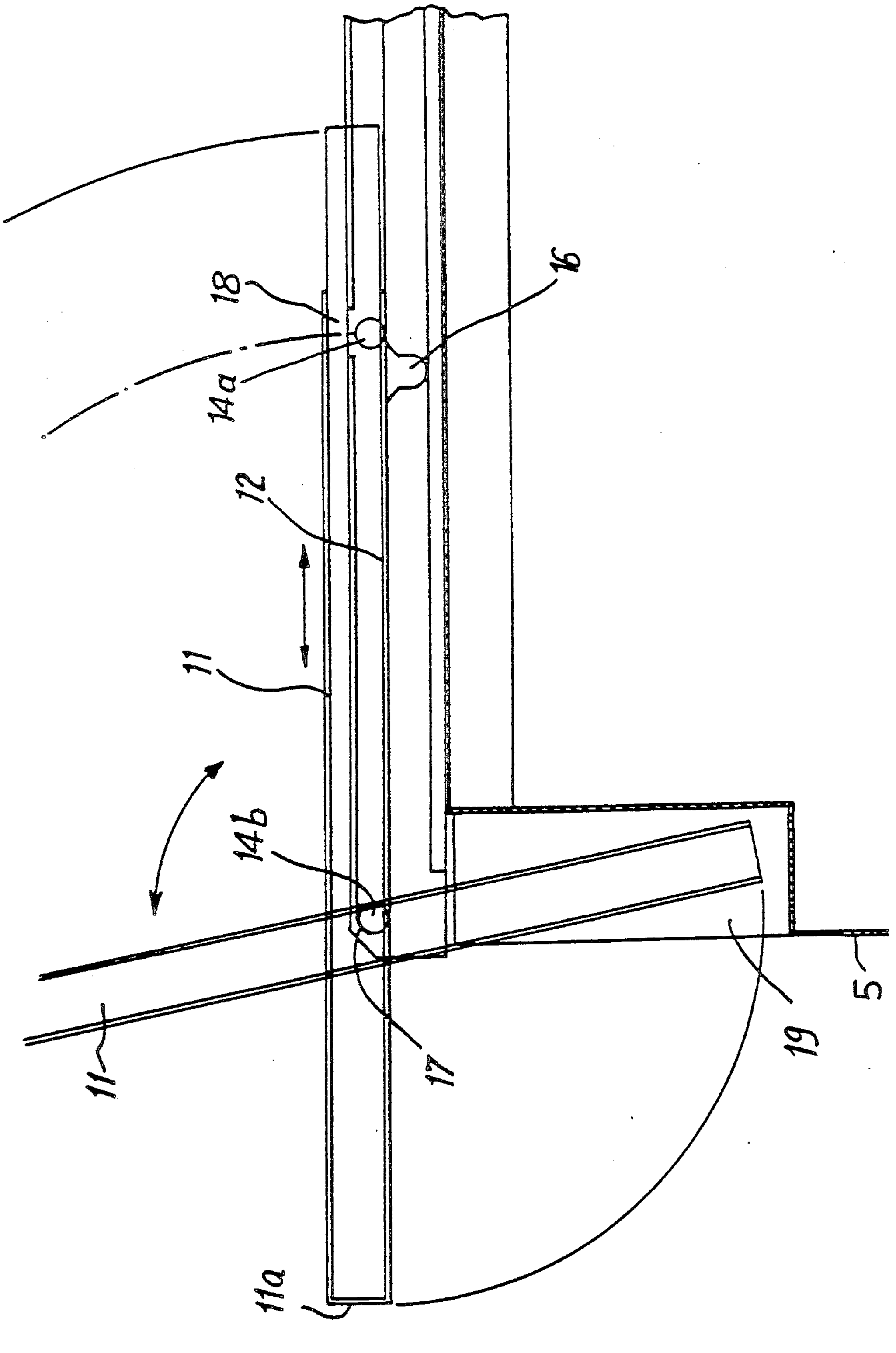
FIG. 4 is a partial elevational view of the apparatus.

In this way, the operator is able to push back the cover which slides rearwardly to its releasing position in which the rear studs **14*b* reach the curved inner end 17 of the rails 12. At this moment, the front studs 14*a* are placed under gaps 18 in the upper surface of the rails 12 so that the user is able to pivot the cover about the horizontal axis materialized by the rear studs 14*b* abutting the inner end 17, until the cover 11 is located in a pivoted-over open position making an angle of more than 90° with its initial planar position, as can be seen in FIG. 4. In this position, which is thus rendered stable, the part of the cover 11 located below the rear studs 14*b* comes to be located within a recess 19 in the upper edge portion of the casing 1**. It will be understood that, in this opened position, the overall size of the cover in height is reduced relative to a cover which pivots about a fixed hinge. Likewise, the space taken up by the path through which the cover travels is reduced. Furthermore, the cover is in large part balanced in rotation about its pivot axis, which facilitates the handling and reduces risks of accident.

The detection of the closing position of the cover 11 may be achieved by any means, for example by a vertical pin 21 which slides just behind the rear edge **11*a* of the cover 11 in the advanced closing position of the latter, this pin 21 only being allowed to be released in the upward direction when said 21** acts as an abutment and therefore edge has passed beyond it. In the raised position, this pin a, may constitute additional means preventing the retraction of the cover.

It must be understood that the invention may be modified in many ways, and in particular the means for guiding, pivoting, detecting and locking the cover may be arranged in a different manner.

We claim:

1. Apparatus with centrifugal rotor and operating under a vacuum, said apparatus comprising means defining an edge of said apparatus, an enclosure, means to establish a vacuum in said enclosure, a centrifugal rotor mounted to be rotatable about a vertical axis in the enclosure, the enclosure defining an upper opening in a substantially horizontal plane, and a cover for closing said opening, the cover comprising a strong plate, guide means associated with the plate for guiding the plate in translation in said plane along the opening between a closing position of the plate superimposed on said opening and a releasing position which is offset in said plane from the closing position, means cooperative with the plate for preventing the plate from moving away from the plane of the opening in said closing position, means associated with the plate for pivoting, solely in said releasing position, the plate about an axis located in the region of said edge so that the plate can occupy, in proximity to said edge, a pivoted position making a large angle with the horizontal plane of the opening.

2. Apparatus according to claim 1, wherein the plate is made from a transparent material.

3. Apparatus according to claim 1, wherein said axis about which the plate is pivotable in said releasing position, extends through the plate in the region of the median third of the plate, so that, in said pivoted position, a part of the plate is located above the plane of translation of the plate and another part is located below said plane in immediate proximity to said edge.

4. Apparatus according to claim 1, wherein said axis about which the plate is pivotable in said releasing position is geometrically projected, on the plate in the region of the median third of the plate, so that, in said pivoted position, a part is located above the plane of translation of the plate and another part of the plate is located below said plane in immediate proximity to said edge.

5. Apparatus according to claim 1, wherein said guide means comprise two rails disposed on each side of the plate and lateral projections of the plate which are in guided relation to said rails and maintain the plate in said horizontal position in the guide means.

6. Apparatus according to claim 5, wherein said lateral projections of the plate are in the form of a pivot or trunnion for permitting the rotation of the plate in said releasing position.

7. Apparatus according to claim 6, wherein said lateral projections are received on each side of the plate in the respective rail of said rails.

8. Apparatus according to claim 1, further comprising a sealing element associated with the opening of the enclosure, said guide means defining, for said closing position of the plate, passages allowing the plate to travel is a downward direction so that the plate is capable of compressing said sealing element.

9. Apparatus according to claim 8, comprising lateral projections on the plate, recesses in a lower part of the rails for receiving said projections when the plate is in said closing position so as to allow said downward travel of the plate toward the sealing element.

10. Apparatus according to claim 5, wherein the guide means define a rear inner end, the projections of the plate permitting, when projections reach a position of abutment against said inner end, a pivoting of the plate about an axis thus constituted, said guide means having upper gaps allowing the passage, during the pivoting of the plate, of said projections which normally serve to maintain the plate in its horizontal position in the rails.

11. Apparatus according to claim 5, comprising fittings mounted on edges of the plate and carrying said projections.

12. Apparatus according to claim 1, further comprising means for locking the plate in said closing position and preventing the translation of the plate away from said closing position.

13. Apparatus according to claim 12, wherein said locking means comprise an abutment which is adapted to be positioned behind an edge of the plate, in said closing position, relative to the direction of movement in translation of the plate toward said closing position.

* * * * *